(12) United States Patent
Snyder

(10) Patent No.: US 8,345,006 B2
(45) Date of Patent: Jan. 1, 2013

(54) DEFORMABLE COMPUTER MOUSE

(76) Inventor: Bradley Lee Snyder, Spotsylvania, VA (US)

( * ) Notice: Subject to any disclaimer, the term of this patent is extended or adjusted under 35 U.S.C. 154(b) by 106 days.

(21) Appl. No.: 13/048,892

(22) Filed: Mar. 16, 2011

(65) Prior Publication Data
US 2012/0235911 A1 Sep. 20, 2012

(51) Int. Cl.
*G06F 3/033* (2006.01)
*G09G 5/08* (2006.01)

(52) U.S. Cl. ........................................ 345/163; 345/156

(58) Field of Classification Search .................. 345/156, 345/161–173
See application file for complete search history.

(56) References Cited

U.S. PATENT DOCUMENTS

| 5,457,480 | A  | * | 10/1995 | White ............................ 345/163 |
| 6,422,942 | B1 | * | 7/2002 | Jeffway et al. ................... 463/31 |
| 7,298,359 | B2 | * | 11/2007 | Kim et al. ....................... 345/158 |
| 7,407,439 | B1 | * | 8/2008 | Ochoa ............................. 463/37 |
| 7,724,238 | B2 | * | 5/2010 | Daniel et al. ................... 345/163 |

* cited by examiner

*Primary Examiner* — Ricardo L Osorio
(74) *Attorney, Agent, or Firm* — Oakwood Law Group, LLP; Jie Tan

(57) ABSTRACT

A deformable computer mouse for easy storage and portability. The mouse housing includes a flat top layer having at least two splitable pieces and an intermediate layer sliding mounted underneath. By pulling the two splitable pieces upward, the intermediate layer slides out and forms an arced surface together with the two splitable pieces, thus forming a full sized computer mouse.

14 Claims, 7 Drawing Sheets

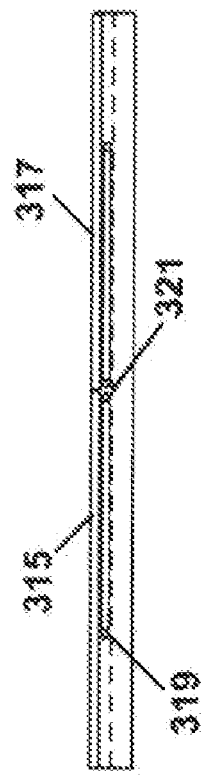
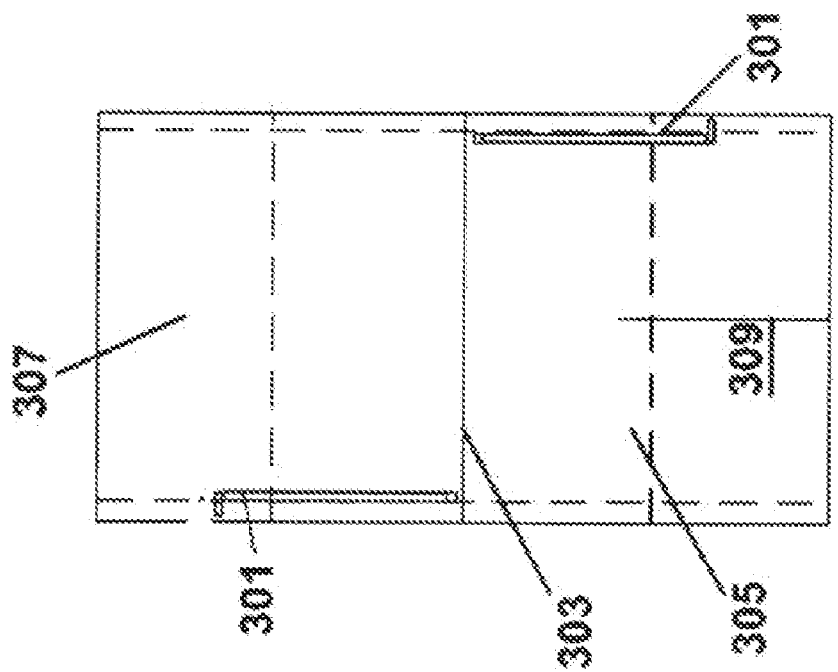

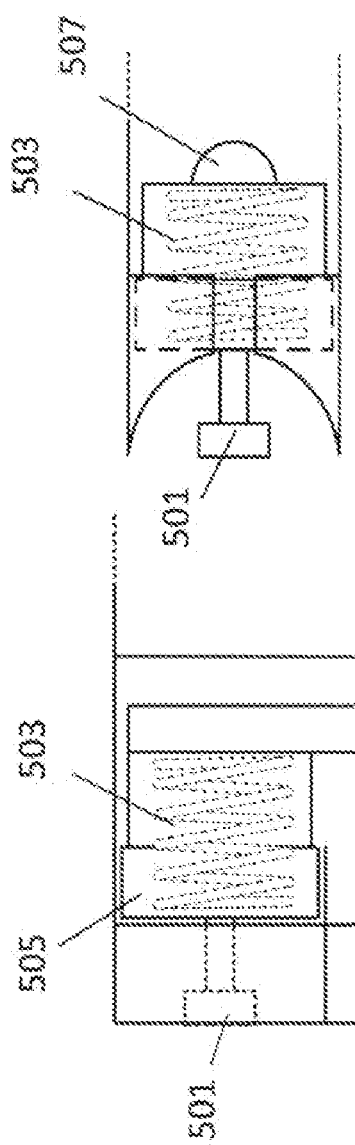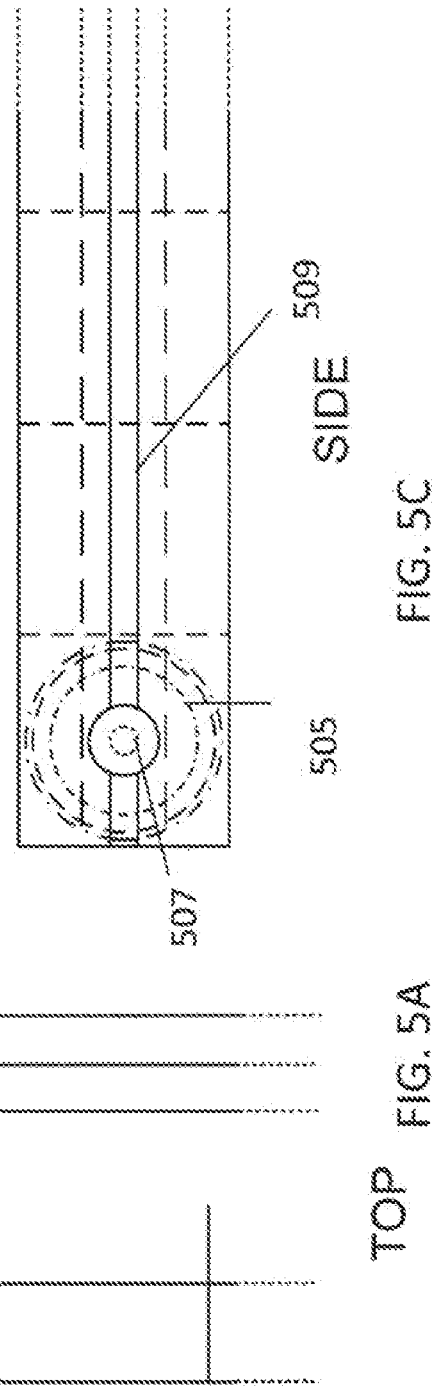

DEFORMABLE COMPUTER MOUSE

DESCRIPTION OF RELATED ART

The present application relates to cursor-positioning computer devices, and more particularly to computer mice that are deformable to provide a small form factor that can be carried inside a computer body, or easily carried external to the computer.

Note that the points discussed below may reflect the hindsight gained from the disclosed inventions, and are not necessarily admitted to be prior art.

Computer mouse or "mouse" is one of the most widely-used computer peripheral devices for cursor-positioning on a computer screen. Control element, such as a "trackball" free-floating inside a mouse housing rolls on a "mouse pad", changing contacting physical positions with the pad, and electronic sensors then translate these "trackball" physical position changes into electronic signals which changes the cursor positions on a computer screen.

Many computer mouse models include a scroll wheel or thumb wheel which can be rotated to move the cursor without physical movement of the mouse, either instead of or in addition to, a trackball which may be moved across a working surface. Mechanisms inside the mouse detect the manipulation of the scroll wheel or thumb wheel and electronic components such as switches translate these physical manipulations into electronic signals which are communicated to the computer to control the position.

A computer mouse may include a left (or "enter") button and a right button. Pressing the left or right button is commonly referred to as a "left click" or a "right click", respectively. Various computer functions can be controlled by pressing these buttons, depending on the position of the cursor and the software being used. Mechanisms inside the mouse detect the manipulation, i.e. "clicking" of the buttons and electronic components translate such manipulations into electronic signals which are communicated to the computer to control the position of the cursor on the computer screen.

In order for the hand to comfortably hold the mouse and operate the mouse, a conventional mouse is generally arc-shaped to fit to a relaxed half fist of the hand. The size of the mouse housing is best to fit with a half fist to allow the hand to operate comfortably and deftly.

Computer mouse of some other types of shapes are also developed. Such as a cursor controlling device wearable on a user's fingers is described in the US Patent Application US 2010/0201625 A1.

Another example, such as US 2010/0231514 (A1) describes a customizable mouse that has a detached core module and case module where the case modules can be customized to fit with special finger shape and needs.

However, most of the improvements are either functional improvements or in exterior design to better fit the shape of a hand or for easiness of the fingers.

For the growing number of tablet computing devices, because of the highly portable nature, a matching portable mouse design is lacking. The current bulky mouse design becomes inconvenient for a tablet user to carry. Many tablets rely on simply using a touch screen for interacting with the device. This user interface is undesirable for many users on many levels.

Users typically feel that this interface is great for limited work and play; however more intensive work typically requires a mouse. A full size mouse is often needed for gaming, graphics, and concentrated editing. The present gaming market for tablets is quick games to play with a casual "fun-factor" associated with them.

The size of computing devices is becoming smaller, and the ability to carry a full-sized mouse in a limited space will be beneficial to users. An introduction of portable mice, which to the tablet community would bring serious games to the market, would make the tablet device extremely desirable as well. It also gives developers another tool in which to create more innovative games and applications. The problem is that the mice that are on the market today do not have the proper form factor in order to properly bring a mouse with a user so that it is easily portable. This application provides a new solution to a computer mouse. A full-sized collapsible mouse solves this issue.

SUMMARY

The present application discloses new approaches for a portable computer to carry a full-size mouse, and to more readily carry a full size mouse in a small form factor.

In one embodiment, a collapsible full-size computer mouse is constructed to collapse into a flat rectangular box to be stored into the body of a portable computer. If housed within another device, the mouse can be charged while stored.

In one embodiment, the mouse's base is extended by means of the mouse splitting in half with a thin sheet of metal on the top and on the bottom keeping the two halves together.

In one embodiment, the top of the mouse is stretched upward, the top layer of the mouse housing is split into two sections connected by only a thin sheet of metal. The top layer of the mouse housing comprises three pieces of metal, in which the middle piece slides below the other two when in the closed state. As the top portion opens, the middle piece is exposed as the user "arcs" the three pieces of connecting metal.

In one embodiment, underneath the top layer of the mouse housing, there is a small rail system with two small metal rods connected in a horizontal position. As the user pulls upward on the top portion of the mouse, the two rods continue to become more vertical as well as turning on the power to the mouse. At certain positions in the arc, the rods lock into place so that the user cannot push the arc back down. Once the user places arc into the desired position, the rods remain locked into place until the user presses a release mechanism which allows the user to put the mouse back into its closed state, which also turns the power off.

In one embodiment, the mouse comprises a rail system that comprises four rods attached to respective "plunger" systems with an internal spring in each. The user pushes on the external side of the plunger, which depresses the spring to lock or unlock the rods. The user can adjust the mouse housing position horizontally by sliding the rods to the next desired slot. Once at the desired adjustment, by releasing the plunger which also releases the spring, the rod locks the mouse housing into place until the user either repositions the rods or places it back into the starting position for docking or travel.

The disclosed innovation, in various embodiments, provides a compactable computer mouse design that allows a tablet computer to store and carry a mouse. The availability of a storable mouse with a tablet computer will increase the availability of many functions associated with a usage of mouse to the tablet computer, thus expanding greatly the capacity of a tablet computer being used in many computing intensive fields.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 3A shows a plan view of an example embodiment of a deformable computer mouse in storage form in accordance with this application.

FIG. 3B shows a cross-section view of the front of an example embodiment of a deformable computer mouse in storage form in accordance with this application.

FIG. 3C shows a cross-section view of the side of an example embodiment of a deformable computer mouse in storage form in accordance with this application.

FIG. 5A shows a top plan view of an example rail system of an embodiment of a deformable computer mouse in accordance with this application.

FIG. 5B shows a front sectional view of the example rail system of FIG. 5A.

FIG. 5C shows a side cross-sectional view of the example embodiment of FIG. 5A.

DETAILED DESCRIPTION OF SAMPLE EMBODIMENTS

Figure 1:
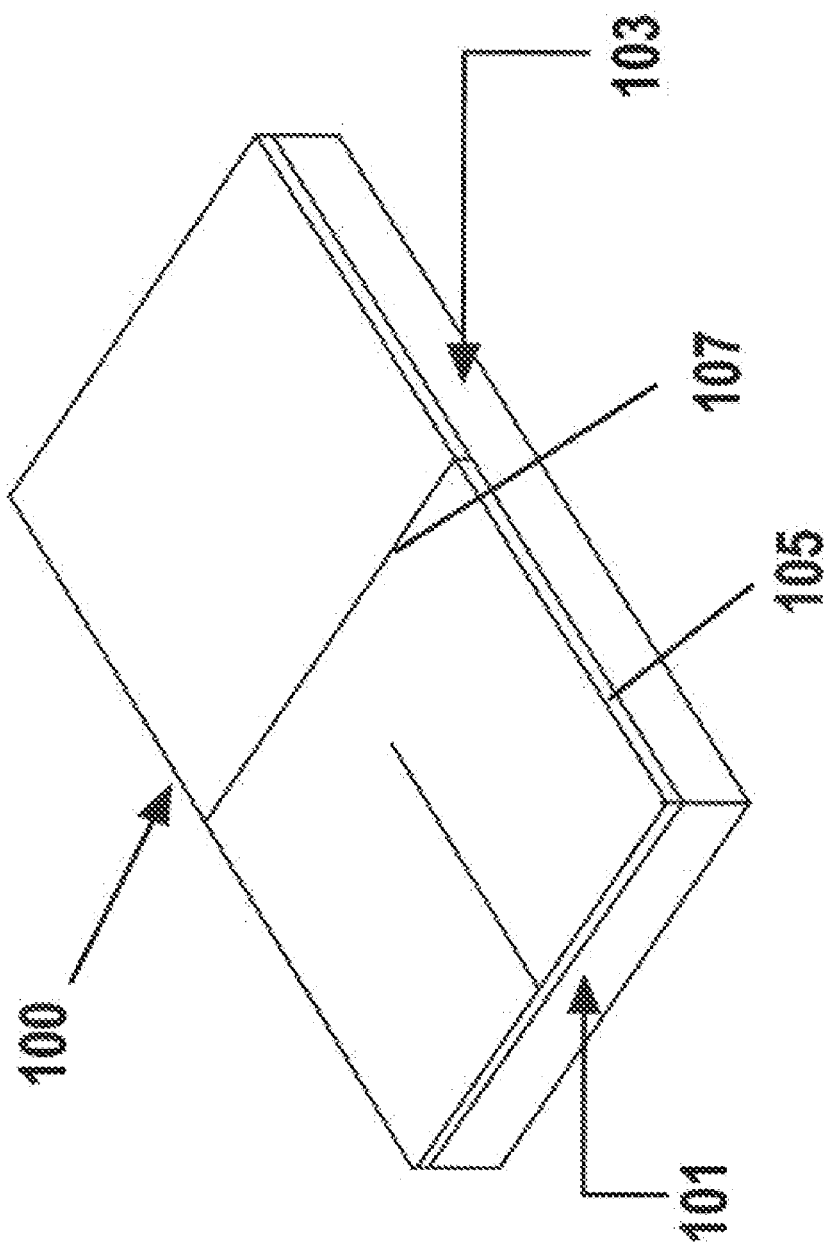
FIG. 1 shows a perspective view of an example embodiment of a deformable computer mouse in storage form in accordance with this application.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

In reference to FIG. 1, computer mouse 100 is a rectangularly shaped flat surfaced housing in storage form. Flat surfaced rectangular box-like computer mouse 100 can be easily inserted into a slit of a tablet computer for easy carry-around. The highly collapsible mouse design may be adopted for other computing devices, and for the storage of the collapsed mouse within the computing device such as, a desktop computer, laptop, net book, Smartphone, or any other object in which said device can be placed into for storage and/or recharge.

Computer mouse 100 in its "closed" state is completely flat, includes a housing having a front portion 101 and a rear portion 103. Front portion 101 may contain electronic components for wired and wireless connections, such as USB, Bluetooth™, etc. Rear portion 103 may house battery and electronic components for controlling elements, such as a mini-"trackball." On the base layer of computer mouse 100 housing, are sensors, switches and signal conversion components and integrated circuits containing software for button functions and other manipulations placed and affixed.

The mouse housing may include a solid base layer and a deformable multi-piece top layer. The mouse's base may also be extendable, and be extended by means of the mouse splitting in half with a thin sheet of metal on the top and on the bottom keeping the two halves together.

Top layer 105 includes plurality of deformable thin flat sheet of flexible material, such as a front portion and a rear portion, coming aligned together at position 107. Preferably the thin flexible material metal. Additionally a rail system with multiple "notches" is attached on the side edges of the base layer of the mouse housing for the sliding legs to slide out the folded position. The front portion may be further configured for functions of a "left" button and a "right" button.

Figure 2:
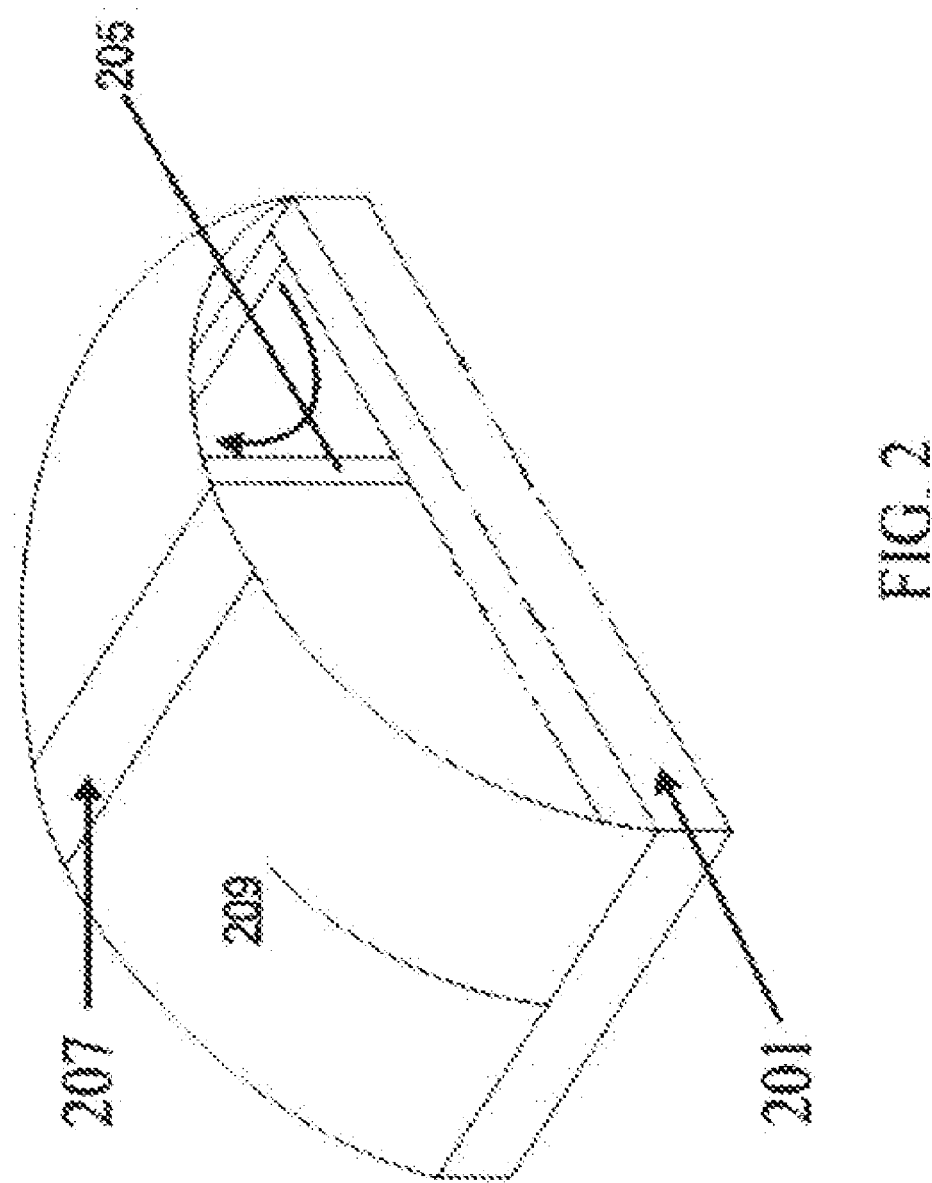
FIG. 2 shows a perspective view of an example embodiment of a deformable computer mouse in usage form in accordance with this application.

In reference to FIG. 2, once the user decides to utilize the mouse, the computer mouse is taken from its storage housing of a computing device, for example via an ejection mechanism, such as a spring loaded button, a tap ejection, or a logical ejection. The mouse is then expanded to full size by user lifting the top layer upward.

In reference to FIG. 3A, the top layer of the mouse can included deformable front portion 309 and rear portion 307 which meet at the split line 303 to form a full "closed" top layer. A middle sheet 305 is slidingly attached underneath front portion 309 and rear portion 307, crossing the split line 303, inside the mouse housing. By simply stretching front portion 309 and rear portion 307 upward where only the top portion of the mouse is split open, the middle piece 305 slides out from below the other two, is exposed as the user "arcs" the three pieces to form a full size computer housing.

Underneath the top portions of the mouse, there may be a small rail system with two small metal rods 301 connected in a horizontal position. As the user pulls upward on the top portion of the mouse, the two rods continue to become more vertical as well as turning on the power to the mouse. At certain positions in the arc, the rods 301 will lock into place so that the user cannot push the arc back down. Once the user places arc into the desired position, the rods remain locked into place until the user presses a release mechanism which allows the user to put the mouse back into its closed state, which turns the mouse off. FIGS. 3B and 3C show the rods in "closed" position. FIG. 3B shows rods 311 are attached/ hinged on the top layer. FIG. 3C shows two rods 319 are attached respectively along the sides of the two splitable top portions 315 and 317, and are configured with suitable length in supporting and stabilizing the full size mouse housing/arc.

As shown in FIG. 2, as user lifts top of the mouse upward causing the top layer 209 to arc, center piece 207 slides out to fill the gap in the middle of the arc, support legs 205 slide on rails from horizontal to vertical position while hinged from the top portions. Multiple "notches" 201 are along the rail in order for the support legs 205 standing in variable positions of mouse arc.

Figure 4D:
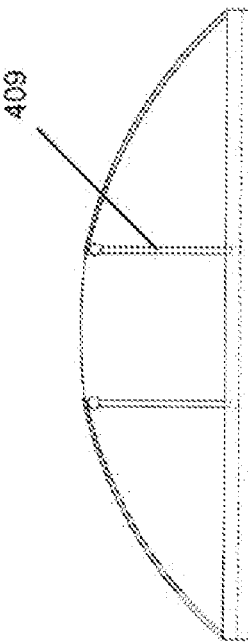
FIG. 4D shows a cross-section view of the side of another example embodiment of a deformable computer mouse in usage form in accordance with this application.
Figure 4C:
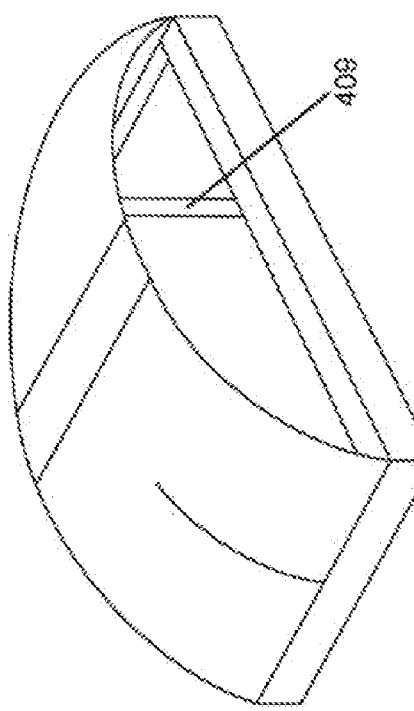
FIG. 4C shows a perspective view of another example embodiment of a deformable computer mouse in usage form in accordance with this application.
Figure 4A:
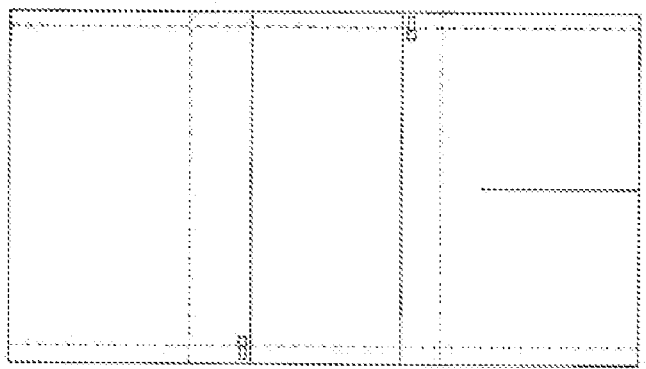
FIG. 4A shows a plan view of another example embodiment of a deformable computer mouse in storage form in accordance with this application.
Figure 4B:
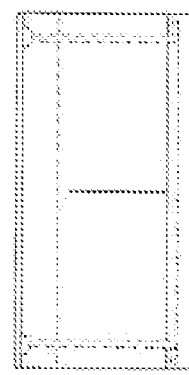
FIG. 4B shows a front elevation view of another example embodiment of a deformable computer mouse in storage form in accordance with this application.

In alternative embodiment, as shown in FIGS. 4C and 4D, legs 409 may be both positioned at the rear portion of the top layer as shown in FIG. 4C, or be positioned at either sides of the center piece attached to front portion and the rear portion of the top layer. In another embodiment, as shown in FIGS. 4A and 4B, the legs may be omitted and the "closed" state top layer may be comprised of three exposed movable pieces hinged together. In case for this device to be used without any rods at all, the top layer locks without any support underneath.

Figure 5D:
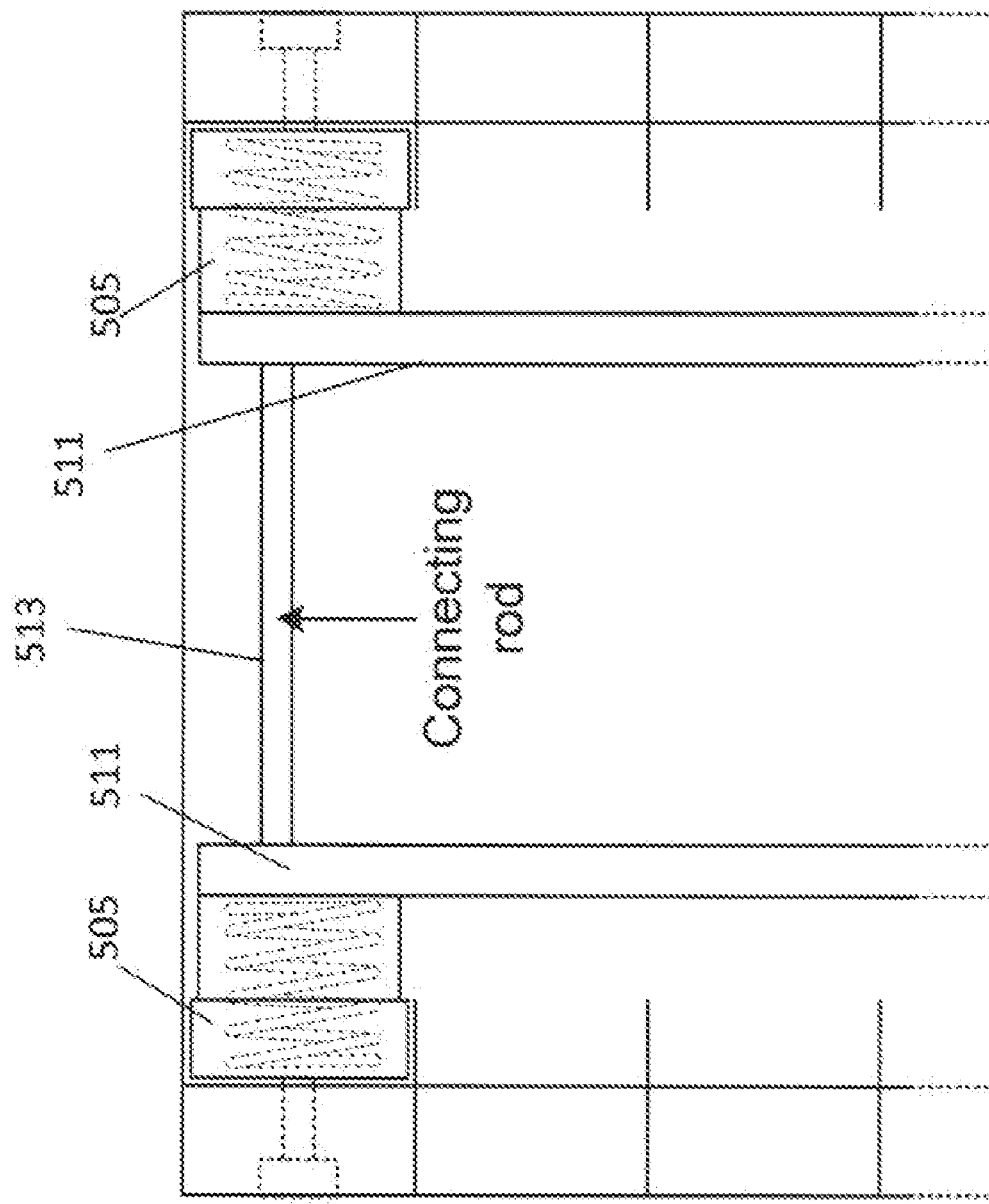
FIG. 5D shows a top view of the front end of an example of embodiment having two rail systems in accordance with this application.

In reference to FIG. 5A, 5B, 5C and 5D, an example plunger mechanism combining a rail system mechanism is provided. The embodiment comprises a rod attached "plunger" system with an internal spring. There may include four rods, two rods for the front side of the mouse, two rods for the back side of the mouse. The plunger system as shown in FIGS. 5A and 5B, includes a plunger 501, an spring holding body 505, an internal spring 503 and pressing button 507. The holding body 505 may be configured to be wheel like and is amounted with a rod 511. As shown in FIG. 5C, holding body 505 may slide on a rail mechanism 509 horizontally, from the end to the middle of the mouse body. As shown in FIG. 5D, two front side plunger holding body may be connected with a connecting rod 513, and both plunger systems slid simultaneously on two horizontally parallel rails to a more middle notch.

The two plunger systems at the back may be connected as well. This arrangement enables the user to squeeze the front and back systems at the same time (using two hands) for ease of use. The rods can also remain unconnected if space is limited.

Figures 6A, 6B, 6C:
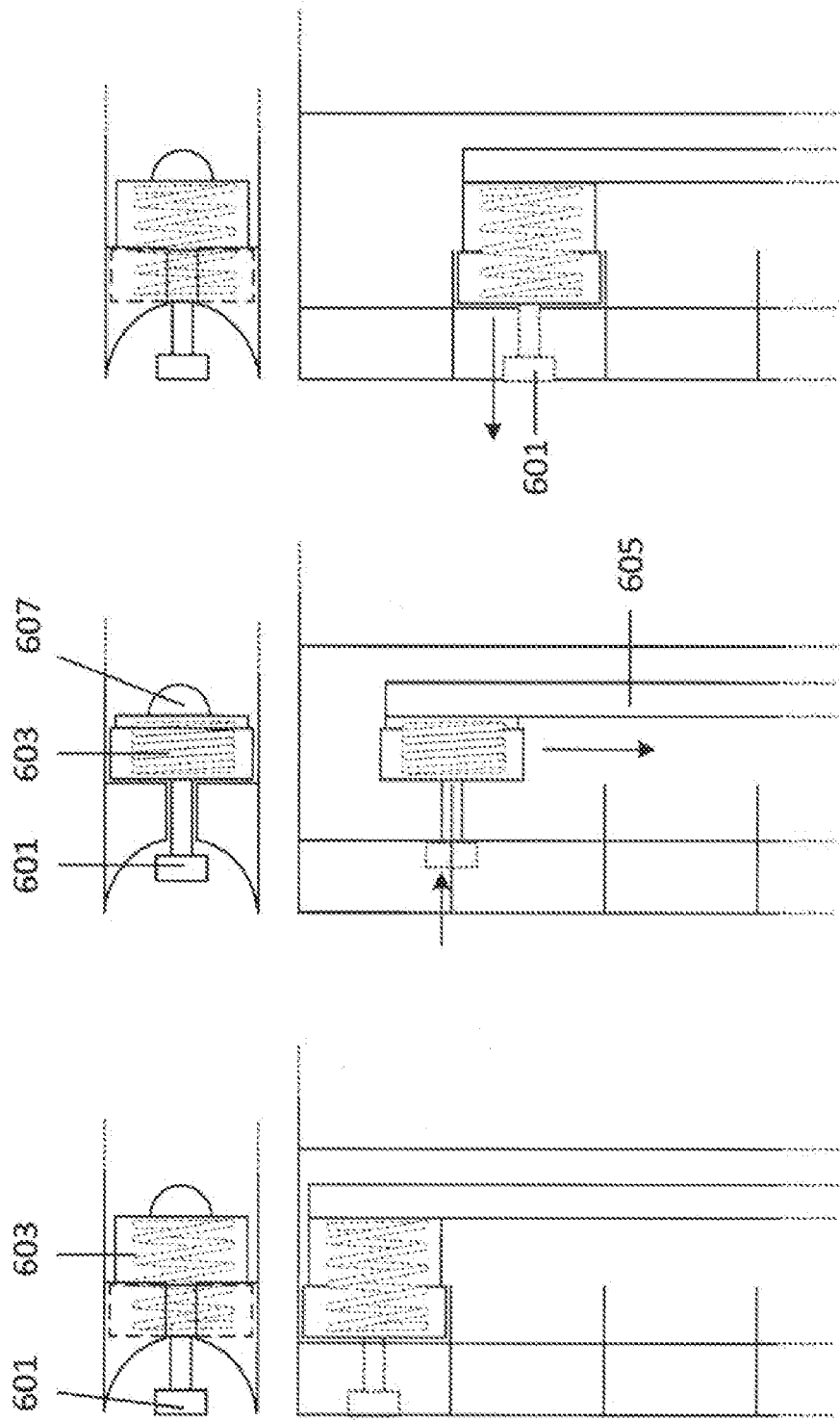
FIGS. 6A, 6B and 6C show a side cross-sectional view of an example embodiment of FIG. 5A in different stages of operation.

In reference to FIGS. 6A, 6B and 6C, in operation, a user may push on the external button 607 which depresses the spring 603, and pulls up plunger 601, thereby releasing the plunger system to undocking status. The user then slides the plunger system horizontally, which brings the attached rod 605 to a desired slot. Once at the desired adjustment, the user releases the plunger 601 to dock plunger 601 on the side wall of the mouse housing by pressing button 607 which releases the spring 603. This action locks the rod into place until the user either repositions the rods or places it back into the starting position for docking or travel.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

Additional general background, such as signal sensing, translation, etc, which helps to show variations and implementations, may be found in the following patent application publication, US 2009/0146955 A1, the entirety of which is hereby incorporated by reference herein for all purposes.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A deformable computer mouse having electronic functions in interaction with a computer, comprising:
   a top layer having at least a left side and at least a right side, being detachably aligned, forming a flat solid surface, the left side being configured for interaction with fingers, the right side being configured for interaction with palm, the left side and the right side being made of flexible material;
   at least one intermediate layer, slidingly amounted to underneath of said top layer, being configured to slide out and fill and connect between the left side and the right when said left side and said right side split apart;
   a base layer amounted to said top layer, wherein said base layer and said top layer form a housing having sufficient space for electronic components responsible for mouse functions; and
   a plurality of electronic components responsible for mouse functions amounted on said base layer, electronically being connected with said left side and said right side of said top layer.

2. The computer mouse of claim 1, wherein said left side and said right side is made of a metal.

3. The computer mouse of claim 1, wherein said left side and said right side are pulled up and form an arc surface together with intermediate layer.

4. The computer mouse of claim 1 further comprising a leg fringed on said top layer.

5. The computer mouse of claim 4 further comprising a rail system with a plurality of notches for positioning said leg.

6. The computer mouse of claim 4, wherein said leg is locked at horizontal position underneath of the top layer, and is stretched to vertical position when the top layer is pulled up to arc position.

7. The computer mouse of claim 1 is sized to be stored inside a slot of a tablet computer.

8. The computer mouse of claim 7 wherein the computer mouse is charged by inserting the computer mouse into a storage slot of a computer.

9. The computer mouse of claim 1 is battery powered.

10. The computer mouse of claim 1 wherein said base layer comprises plurality of base pieces, expandable by stretching apart the plurality of base pieces.

11. The computer mouse of claim 1, further comprising a plunger system wherein said plunger system is mounted with a leg which is repositionable by said plunger system.

12. The computer mouse of claim 11, wherein said plunger system is horizontally slidingly mounted on a rail system.

13. The computer mouse of claim 11, wherein said plunger system comprises a spring, a plunger, a plunger holding body and a button wherein pressing said button presses said spring which undocks said plunger.

14. The computer mouse of claim 11, wherein two horizontally parallel said plunger systems are disposed at the left side and two horizontally parallel said plunger systems are disposed at the right side.

* * * * *